US009686117B2

(12) United States Patent
Pope et al.

(10) Patent No.: US 9,686,117 B2
(45) Date of Patent: Jun. 20, 2017

(54) CHIMNEY ONLOAD IMPLEMENTATION OF NETWORK PROTOCOL STACK

(71) Applicant: Solarflare Communications, Inc., Irvine, CA (US)

(72) Inventors: Steven L. Pope, Costa Mesa, CA (US); David J. Riddoch, Huntingdon (GB)

(73) Assignee: Solarflare Communications, Inc., Irvine, CA (US)

( * ) Notice: Subject to any disclaimer, the term of this patent is extended or adjusted under 35 U.S.C. 154(b) by 286 days.

(21) Appl. No.: 13/720,770

(22) Filed: Dec. 19, 2012

(65) Prior Publication Data

US 2013/0111059 A1  May 2, 2013

Related U.S. Application Data

(63) Continuation-in-part of application No. 12/373,173, filed as application No. PCT/IB2007/003444 on Jul. 9, 2007, now Pat. No. 8,489,761.

(30) Foreign Application Priority Data

Jul. 10, 2006 (GB) .................................. 0613684.0
Jul. 10, 2006 (GB) .................................. 0613687.3
Jul. 13, 2006 (GB) .................................. 0613976.0

(51) Int. Cl.
*G06F 15/16* (2006.01)
*H04L 29/06* (2006.01)
*G06F 12/00* (2006.01)

(52) U.S. Cl.
CPC ............ *H04L 29/06* (2013.01); *H04L 69/161* (2013.01)

(58) Field of Classification Search
USPC ................................ 709/201, 203, 223–237
See application file for complete search history.

(56) References Cited

U.S. PATENT DOCUMENTS 5,272,599 A   12/1993  Koenen
5,325,532 A    6/1994  Crosswy et al.
(Continued)

FOREIGN PATENT DOCUMENTS

EP        620521 A2   10/1994
WO     00-41358 A2    7/2000
(Continued)

OTHER PUBLICATIONS

Speight et al: "WSDLite: A Lightweight Alternative to Windows Sockets Direct Path", Proceedings of the 4th USENIX Windows Systems Symposium, Aug. 4, 2000 (Aug. 4, 2000), pp. 113-124.
(Continued)

*Primary Examiner* — Zarni Maung
(74) *Attorney, Agent, or Firm* — Haynes, Beffel & Wolfeld LLP

(57) ABSTRACT

A software networking arrangement for operation in a data processing system comprising an OS being operable in: a first mode in which it performs protocol processing of a flow of traffic data and then passes the protocol processed data to a NIC for transmission; and a second mode in which it does not perform protocol processing, the OS being arranged to, on entering the second mode, transmit a message to the NIC indicating that the NIC is to perform protocol processing of the flow of traffic data; the software networking arrangement comprising: a protocol processing entity; and a driver for a NIC configured to receive said message from the OS and in response thereto, configure the protocol processing entity to perform transport-level protocol processing of the flow of traffic data received from an application within the context of that application and then pass the protocol processed data to the NIC.

34 Claims, 4 Drawing Sheets

(56) References Cited

U.S. PATENT DOCUMENTS

| | | | |
|---|---|---|---|
| 5,946,189 A | 8/1999 | Koenen et al. | |
| 6,098,112 A | 8/2000 | Ishijima et al. | |
| 6,160,554 A | 12/2000 | Krause | |
| 6,226,680 B1 | 5/2001 | Boucher et al. | |
| 6,247,068 B1* | 6/2001 | Kyle | 719/328 |
| 6,304,945 B1 | 10/2001 | Koenen | |
| 6,349,035 B1 | 2/2002 | Koenen | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,907,042 B1* | 6/2005 | Oguchi | 370/412 |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,424,710 B1* | 9/2008 | Nelson et al. | 718/1 |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,653,754 B2 | 1/2010 | Kagan et al. | |
| 7,688,838 B1* | 3/2010 | Aloni et al. | 370/412 |
| 7,688,853 B2 | 3/2010 | Santiago et al. | |
| 7,742,473 B2* | 6/2010 | Adams et al. | 370/389 |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 8,341,636 B2 | 12/2012 | Wilhelm, Jr. | |
| 8,478,907 B1* | 7/2013 | Aloni et al. | 709/250 |
| 9,417,942 B1* | 8/2016 | Venkataraman | G06F 11/0727 |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0007165 A1 | 1/2003 | Hudson | |
| 2003/0012168 A1* | 1/2003 | Elson | G01D 9/005 370/338 |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2003/0223425 A1* | 12/2003 | Shenoy | H04L 45/60 370/394 |
| 2004/0049621 A1 | 3/2004 | Singh et al. | |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0021680 A1* | 1/2005 | Ekis et al. | 709/219 |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066060 A1* | 3/2005 | Pinkerton et al. | 709/249 |
| 2005/0066333 A1 | 3/2005 | Krause et al. | |
| 2005/0172181 A1 | 8/2005 | Huliehel | |
| 2005/0210479 A1* | 9/2005 | Andjelic | H04L 49/90 719/321 |
| 2005/0219278 A1 | 10/2005 | Hudson | |
| 2005/0219314 A1 | 10/2005 | Donovan et al. | |
| 2005/0223134 A1* | 10/2005 | Vasudevan et al. | 710/22 |
| 2005/0231751 A1 | 10/2005 | Wu et al. | |
| 2005/0281286 A1* | 12/2005 | Wang et al. | 370/469 |
| 2006/0026443 A1 | 2/2006 | McMahan et al. | |
| 2006/0045098 A1 | 3/2006 | Krause | |
| 2006/0104295 A1 | 5/2006 | Worley et al. | |
| 2006/0104308 A1* | 5/2006 | Pinkerton et al. | 370/469 |
| 2006/0126619 A1 | 6/2006 | Teisberg et al. | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1* | 11/2006 | Hudson et al. | 709/226 |
| 2006/0259661 A1* | 11/2006 | Feng et al. | 710/39 |
| 2007/0188351 A1 | 8/2007 | Brown et al. | |
| 2007/0220183 A1 | 9/2007 | Kagan et al. | |
| 2008/0024586 A1 | 1/2008 | Barron | |
| 2008/0059677 A1 | 3/2008 | Archer et al. | |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0240130 A1* | 10/2008 | Oved | 370/401 |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0165003 A1 | 6/2009 | Jacobson et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0017811 A1* | 1/2010 | Sng | 719/328 |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0188140 A1 | 7/2010 | Smeloy | |

(56) References Cited

U.S. PATENT DOCUMENTS

| | | |
|---|---|---|
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | | |
|---|---|---|---|
| WO | 2001048972 | A1 | 7/2001 |
| WO | 2002035838 | A1 | 5/2002 |
| WO | 2005-074611 | A2 | 8/2005 |
| WO | 2005-104475 | A2 | 11/2005 |
| WO | 2008127672 | A2 | 10/2008 |
| WO | 2009136933 | A1 | 11/2009 |
| WO | 20090134219 | A1 | 11/2009 |
| WO | 2010020907 | A2 | 2/2010 |
| WO | 2010087826 | A1 | 8/2010 |
| WO | 2011043769 | A1 | 4/2011 |
| WO | 2011053305 | A1 | 5/2011 |
| WO | 2011053330 | A1 | 5/2011 |

OTHER PUBLICATIONS

Microsoft: "Windows Platform Design Notes: Winsock Direct and Protocol Offload on SANs". Mar. 3, 2001 (Mar. 3, 2001), pp. 1-8.
EP 13169223.8—Extended European Search Report dated Mar. 20, 2014, 16 pages.
EP 12189774.8 Search Report dated May 31, 2013.
Microsoft Windows Scalable Networking Initiative, WInHEC 2004 Version, Apr. 13, 2004, Microsoft Corporation, 12 pages.
Scalable Networking: Network Protocol Offload-Introducing TCP Chimney, WinHEC 2004 Version, Micorsoft Corporoation 2004, 30 pages.
EP 12189776.3 Search Report dated May 31, 2013.
Druschel et al. "Lazy Receiver Processing (LRP): A Network Subsystem Architecture for Server Systems," OSDI '96 Proceedings of the Second USENIX Symposium on Operating Systems Design and Implementation, pp. 261-275, New York, NY, USA (1996).
"HDK Technical Reference," OpenServer 6 and Unixware (SVR5) HDK, Apr. 1, 2005, pp. 1-173.
Banga, G. et al., "A Sand Explicit Event Delivery Mechanism for UNIX," The USENIX Association, In Proceedings of the USENIX Annual Technical Conference, 1999, 14 pages.
Langendoen, K. et al., "Integrating Polling, Interrupts, and Thread Management," IEEE Computer Society, In Proceedings of the 6th Symposium on the Frontiers of Massively Parallel Computation, 1996, pp. 13-22.
EP-13174385.8—Extended European Search Report dated Aug. 6, 2013, 8 pages.
Jonathan M. Smith and C. Brendan S. Traw; IEEE Network, vol. 7, Issue 4, pp. 44-52, 1993, Jul. 1993.
Jeffrey R. Michel; MSci Thesis, University of Virginia, 1993, Aug. 1993.
Mark David Hayter; PhD Thesis, University of Cambridge, 1993, Sep. 1993.
Jonathan Kay and Joseph Pasquale; ACM Computer Communication Review, vol. 23, No. 4, pp. 259-268, 1993, Oct. 1993.
W. E. Leland, et al.; ACM Computer Communication Review, vol. 23, No. 4, p. 85-95, 1993, Oct. 1993.

C. A. Thekkath, et al.; ACM Computer Communication Review, vol. 23, No. 4, 1993, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, 1993, Dec. 1993.
Matthias Kaiserswerth; IEEE/ACM Transactions on Networking, vol. 1, No. 6, p. 650-663, 1993, Dec. 1993.
Chris Maeda, Brian Bershad; ACM Operating Systems Review, vol. 27, Issue 5, p. 244-255, 1993, Dec. 1993.
Greg Regnier, et al.; IEEE Micro, vol. 24, No. 1, p. 24-31, 1994, Jan. 1994.
J. Vis; ACM Computer Communication Review, vol. 24, No. 1, pp. 7-11, 1994, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, 1994, May 1994.
Various forum members; Message-Passing Interface Forum, University of Tennessee, Knoxville, 1994, May 5, 1994.
Raj K. Singh, et al.; ACM Computer Communication Review, vol. 24, No. 3, p. 8-17, 1994, Jul. 1994.
P. Druschel, et al.; ACM Computer Communication Review, vol. 24, No. 4, 1994, Oct. 1994.
Sally Floyd; ACM Computer Communication Review, vol. 24, No. 5, p. 8-23, 1994, Oct. 1994.
A. Edwards, et al.; ACM Computer Communication Review, vol. 24, No. 4, pp. 14-23, 1994, Oct. 1994.
L. S. Brakmo, et al.; ACM Computer Communication Review, vol. 24, No. 4, p. 24-35, 1994, Oct. 1994.
A. Romanow and S. Floyd; ACM Computer Communication Review, vol. 24, No. 4, p. 79-88, 1994, Oct. 1994.
R. J. Black, I. Leslie, and D. McAuley; ACM Computer Communication Review, vol. 24, No. 4, p. 158-167, 1994, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, 1995, Oct. 1995.
C. Partridge, J. Hughes, J. Stone; ACM Computer Communication Review, vol. 25, No. 4, p. 68-76, 1995, Oct. 1995.
A. Edwards, S. Muir; ACM Computer Communication Review, vol. 25, No. 4, 1995, Oct. 1995.
J. C. Mogul; ACM Computer Communication Review, vol. 25, No. 4, 1995, Oct. 1995.
Thorsten von Eicken, et al.; ACM Operating Systems Review, vol. 29, Issue 5, p. 109-126, 1995, Dec. 1995.
D. L. Tennenhouse, D. J. Wetherall; ACM Computer Communication Review, vol. 26, No. 2, pp. 15-20, 1996, Apr. 1996.
Paul Ronald Barham; PhD Thesis, University of Cambridge, 1996, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, 1997, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.

(56) References Cited

OTHER PUBLICATIONS

Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, 1998, Dec. 1998.
M. de Vivo, et al.; ACM Computer Communication Review, vol. 29, No. 1, pp. 81-85, 1999, Jan. 1999.
M. Allman; ACM Computer Communication Review, vol. 29, No. 3, 1999, Jul. 1999.
Steve Muir and Jonathan Smith; Technical Report MS-CIS-00-04, University of Pennsylvania, 2000, Jan. 2000.
Pradhan P et al., "Daytona: A User-Level TCP Stack," online report, 2002, retrieved from the Internet: URL:http://nms.csail.mit.edu/~kandula/data/daytona.pds [retrieved Jun. 20, 2008], 8 pp.
International Search Report issued Sep. 19, 2008 for PCT/IB2007/003444.
Supplementary European search report dated Oct. 10, 2007 for EP 05712621.1.
Dixon JT et al., "Tuning TCP and UDP Demultiplexing," Georgia Institute of Technology, CC Technical Report GIT-CC-09-09, 1998, 36 pp.
International Preliminary Report on Patentability, Chapter I, mailed May 2, 2008 in PCT/GB2006/003828.
Gordon E. Moore; Electronics, vol. 38, No. 8, pp. 114-117, 1965, Apr. 19, 1965.
Jack B. Dennis and Earl C. Van Horn; Communications of the ACM, vol. 9, No. 3, pp. 143-155, 1966, Mar. 1966.
Marvin Zelkowitz; Communications of the ACM, vol. 14, No. 6, p. 417-418, 1971, Jun. 1971.
J. Carver Hill; Communications of the ACM, vol. 16, No. 6, p. 350-351, 1973, Jun. 1973.
F.F. Kuo; ACM Computer Communication Review, vol. 4 No. 1, 1974, Jan. 1974.
Vinton Cerf, Robert Kahn; IEEE Transactions on Communications, vol. COM-22, No. 5, pp. 637-648, 1974, May 1974.
V. Cerf, et al.; ACM Computer Communication Review, vol. 6 No. 1, p. 1-18, 1976, Jan. 1976.
Robert M. Metcalfe and David R. Boggs; Communications of the ACM, vol. 19, Issue 7, pp. 395-404, 1976, Jul. 1976.
P. Kermani and L. Kleinrock; Computer Networks, vol. 3, No. 4, pp. 267-286, 1979, Sep. 1979.
John M. McQuillan, et al.; Proceedings of the 6th Data Communications Symposium, p. 63, 1979, Nov. 1979.
Andrew D. Birrell, et al.; Communications of the ACM, vol. 25, Issue 4, pp. 260-274, 1982, Apr. 1982.
Ian M. Leslie, et al.; ACM Computer Communication Review, vol. 14, No. 2, pp. 2-9, 1984, Jun. 1984.
John Nagle; ACM Computer Communication Review, vol. 14, No. 4, pp. 11-17, 1984, Oct. 1984.
Robert M. Brandriff, et al.; ACM Computer Communication Review, vol. 15, No. 4, 1985, Sep. 1985.
C. Kline; ACM Computer Communication Review, vol. 17, No. 5, 1987, Aug. 1987.
Christopher A. Kent, Jeffrey C. Mogul; ACM Computer Communication Review, vol. 17, No. 5, pp. 390-401, 1987, Oct. 1987.
Gary S. Delp, et al.; ACM Computer Communication Review, vol. 18, No. 4, p. 165-174, 1988, Aug. 1988.
David R. Boggs, et al.; ACM Computer Communication Review, vol. 18, No. 4, p. 222-234, 1988, Aug. 1988.
H. Kanakia and D. Cheriton; ACM Computer Communication Review, vol. 18, No. 4, p. 175-187, 1988, Aug. 1988.
V. Jacobson; ACM Computer Communication Review, vol. 18, No. 4, p. 314-329, 1988, Aug. 1988.
David D. Clark; ACM Computer Communication Review, vol. 18, No. 4, pp. 106-114, 1988, Aug. 1988.
Paul V. Mockapetris, Kevin J. Dunlap; ACM Computer Communication Review, vol. 18, No. 4, pp. 123-133, 1988, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, 1989, Apr. 1989.
R. Braden, et al.; ACM Computer Communication Review, vol. 19, No. 2, p. 86-94, 1989, Apr. 1989.
David D. Clark, et al.; IEEE Communications Magazine, vol. 27, No. 6, pp. 23-29, 1989, Jun. 1989.
David R. Cheriton; ACM Computer Communication Review, vol. 19, No. 4, p. 158-169, 1989, Sep. 1989.
Derek Robert McAuley; PhD Thesis, University of Cambridge, 1989, Sep. 1989.
Craig Partridge; ACM Computer Communication Review, vol. 20, No. 1, p. 44-53, 1990, Jan. 1990.
D. D. Clark and D. L. Tennenhouse; ACM Computer Communication Review, vol. 20, No. 4, pp. 200-208, 1990, Sep. 1990.
Eric C. Cooper, et al.; ACM Computer Communication Review, vol. 20, No. 4, p. 135-144, 1990, Sep. 1990.
Bruce S. Davie; ACM Computer Communication Review, vol. 21, No. 4, 1991, Sep. 1991.
C. Brendan S. Traw, et al.; ACM Computer Communication Review, vol. 21, No. 4, p. 317-325, 1991, Sep. 1991.
Ian Leslie and Derek R. McAuley; ACM Computer Communication Review, vol. 21, No. 4, p. 327, 1991, Sep. 1991.
Mark Hayter, Derek McAuley; ACM Operating Systems Review, vol. 25, Issue 4, p. 14-21, 1991, Oct. 1991.
Gregory G. Finn; ACM Computer Communication Review, vol. 21, No. 5, p. 18-29, 1991, Oct. 1991.
Greg Chesson; Proceedings of the Third International Conference on High Speed Networking, 1991, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, 1992, Oct. 1992.
Peter Steenkiste; ACM Computer Communication Review, vol. 22, No. 4, 1992, Oct. 1992.
Paul E. McKenney and Ken F. Dove; ACM Computer Communication Review, vol. 22, No. 4, 1992, Oct. 1992.
Erich Ruetsche and Matthias Kaiserswerth; Proceedings of the IFIP TC6/WG6.4 Fourth International Conference on High Performance Networking IV, Dec. 14, 1992.
C. Traw and J. Smith; IEEE Journal on Selected Areas in Communications, pp. 240-253, 1993, Feb. 1993.
E. Ruetsche; ACM Computer Communication Review, vol. 23, No. 3, 1993, Jul. 1993.
J. Evans and T. Buller; IEEE TCGN Gigabit Networking Workshop, 2001, Apr. 22, 2001.
M.V. Wilkes and R.M. Needham; ACM SIGOPS Operating Systems Review, vol. 14, Issue 1, pp. 21-29, 1980, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.

(56) References Cited

OTHER PUBLICATIONS

Montry G., OpenFabrics Alliance presentation slides, 14th Symposium on High Performance Interconnects, Aug. 23, 2006, 8pp.
Jun. 4, 2012 examination report for EP 07 858 875, 2pp.
Office Action mailed Aug. 13, 2012 in U.S. Appl. No. 12/373,173 20 pp w/o attachments.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, 2000, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, 2001, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, 2002, Jan. 2002.
Murali Rangarajan, et al.; Technical Report DCR-TR-481, Computer Science Department, Rutgers University, 2002. , Mar. 2002.
Jon Crowcroft, Derek McAuley; ACM Computer Communication Review, vol. 32, No. 5, 2002, Nov. 2002.
Charles Kalmanek; ACM Computer Communication Review, vol. 32, No. 5, pp. 13-19, 2002, Nov. 2002.
Jonathan Smith; ACM Computer Communication Review, vol. 32, No. 5, pp. 29-37, 2002, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, 2003, Apr. 2003.
Tom Kelly; ACM Computer Communication Review, vol. 33, No. 2, pp. 83-91, 2003, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, 2003, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, 2004, May 1, 2004.
Greg Regnier, et al.; Computer, IEEE Computer Society, vol. 37, No. 11, pp. 48-58, 2004, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, 2005, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005, Sep. 2005.
P. Balaji, et al.; Proceedings of the IEEE International Conference on Cluster Computing, 2005, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, 2006, Jan. 2006.
H. K. Jerry Chu; Proceedings of the USENIX Annual Technical Conference 1996, Jan. 1996.
Ken Calvert; ACM Computer Communication Review, vol. 36, No. 2, pp. 27-30, 2006, Apr. 2006.
Jon Crowcroft; ACM Computer Communication Review, vol. 36, No. 2, pp. 51-52, 2006, Apr. 2006.
Greg Minshall, et al.; ACM Computer Communication Review, vol. 36, No. 3, pp. 79-92, 2006, Jul. 2006.
David Wetherall; ACM Computer Communication Review, vol. 36, No. 3, pp. 77-78, 2006, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, 1993, Dec. 1993.
Danny Cohen, et al.; ACM Computer Communication Review, vol. 23, No. 4, p. 32-44, 1993, Jul. 1993.
U.S. Appl. No. 13/722,841—Office Action dated Apr. 16, 2015, 85 pages.
U.S. Appl. No. 12/373,173—Response to Office Action dated Aug. 13, 2012 filed Jan. 14, 2013, 19 pages.
U.S. Appl. No. 12/373,173—Notice of Allowance dated Apr. 4, 2013, 12 pages.
EP 13174385.8—Office Action dated Jan. 29, 2015, 6 pages.
EP 13174385.8—Response to Office Action dated Jan. 29, 2015 filed Jul. 30, 2015, 22 pages.

* cited by examiner

CHIMNEY ONLOAD IMPLEMENTATION OF NETWORK PROTOCOL STACK

CROSS-REFERENCE TO RELATED APPLICATIONS

This application is a Continuation-In-Part of U.S. application Ser. No. 12/373,173, filed Jun. 12, 2009, now U.S. Pat. No. 8,489,761, issued Jul. 16, 2013, which is incorporated herein in its entirety.

BACKGROUND OF THE INVENTION

This invention relates to the transmission of data across a network by means of a data processing system having access to a network interface device that is capable of supporting a communication link over a network with another network interface device.

FIG. 1 represents equipment capable of implementing a prior art protocol stack, such as a transmission control protocol (TCP) stack in a computer connected to a network 106. The equipment includes an application 101, a socket 102 and an operating system 103 incorporating a kernel 104. The socket connects the application to remote entities by means of a network protocol, in this example TCP/IP. The application can send and receive TCP/IP messages by opening a socket and reading and writing data to and from the socket, and the operating system causes the messages to be transported across the network by means of appropriate network hardware 105. For example, the application can invoke a system call (syscall) for transmission of data through the socket and then via the operating system to the network. Syscalls can be thought of as functions taking a series of arguments which cause execution of the CPU to switch to a privileged level and start executing the operating system. Here the syscalls are denoted 1 to N. A given syscall will be composed of a specific list of arguments, and the combination of arguments will vary depending on the type of syscall.

Certain management functions of a data processing device are conventionally managed entirely by the operating system. These functions typically include basic control of hardware (e.g. networking hardware) attached to the device. When these functions are performed by the operating system the state of the computing device's interface with the hardware is managed by and is directly accessible to the operating system. Alternatively, at least some of the functions usually performed by the operating system may be performed by code running at user level. In a user-level architecture at least some of the state of the function can be stored by the user-level code. This can cause difficulties when an application performs an operation that requires the operating system to interact with or have knowledge of that state.

In particular, state control of networking hardware is conventionally handled by the operating system. Thus applications having data to transmit over the network to which a network interface device is connected must pass their data to the operating system for processing into data packets for transmission over the network. Conventionally the operating system performs all (at least statefull) protocol processing and would therefore handle requests for retransmission, segmentation and reassembly, flow control, congestion avoidance etc.

Alternatively, a protocol stack may be implemented in user mode, with data being passed from the application to the stack for processing and onto the network interface device for transmission without involving the operating system. The stack could be a TCP/IP stack, with most user level TCP/IP stack implementations to date being based on porting pre-existing kernel code bases to user level. Examples of these are Arsenic and Jet-stream. However, these have not addressed a number of the problems required to achieve a complete, robust, high-performance commercially viable implementation.

Instead of implementing a stack at user-level, some systems offload the TCP stack onto a NIC equipped with a TCP Offload Engine (TOE) for handling the TCP protocol processing. This reduces the load on the system CPU. Typically, data is sent to a TOE-enabled NIC via a TOE-enabled virtual interface driver, by-passing the kernel TCP/IP stack entirely. Data sent along this fast path therefore need only be formatted to meet the requirements of the TOE driver.

Alacritech, Inc. has developed a range of network interface cards having TCP offload engines. Various aspects of the Alacritech network interface cards and associated technologies are described in US patent applications having the following publication numbers: U.S. Pat. No. 6,226,680, U.S. Pat. No. 6,247,060, U.S. Pat. No. 6,334,153, U.S. Pat. No. 6,389,479, U.S. Pat. No. 6,393,487, U.S. Pat. No. 6,427,171, U.S. Pat. No. 6,427,173, U.S. Pat. No. 6,434,620, U.S. Pat. No. 6,470,415, U.S. Pat. No. 6,591,302.

However, performing the TCP protocol processing at the NIC requires the NIC to have considerable processing power. This increases expense, especially since embedded processing power on devices such as network interface devices is typically more expensive than main processor power. TOE NICs are therefore more expensive than generic network adapters. Furthermore, data must be processed twice: firstly at the top edge of the TOE driver, and secondly at the TOE-enabled NIC to form TCP packets.

The network architecture of the latest Microsoft Windows operating system will support TOE-enabled NICs. Collectively the network architecture is known as Chimney. Chimney supports both TOE enabled network devices and TOE/RDMA enabled network devices, with TOE/RDMA enabled network devices being able to interpret the RDMA protocols and deliver data directly into user-level buffers, in addition to running a TCP stack on a CPU embedded on the network device.

Under the Chimney model a network connection to a remote computer is always first negotiated using the default kernel TCP/IP stack. The use of additional protocols (such as RDMA) is then progressively negotiated. The kernel stack may hand over control of a given TCP/IP data flow if the flow matches certain conditions. For example, the kernel stack may hand over control of a data flow to a TOE-enabled NIC if the flow is long lived or if large amounts of data are being transferred. This allows the flow to take advantage of the fast data path provided by the interface and shown in FIG. 2. Alternatively, the flow may be handed over to the NIC in dependence on the destination address of the data, or after a predetermined amount of time. Or simply on a per-port basis where the ports are decided by the operator.

The handover is initiated by the operating system sending a state handover message to the network interface device via the driver interface of the network device. The state handover messaging forms part of Network Driver Interface Specification (NDIS) 6.0, currently in development by Microsoft. The NDIS API interfaces vendor specific driver code to the core operating system and provides the state update interface in the Chimney model.

In response to a state handover message received from the operating system, a driver for the TOE-enabled NIC that is to take over protocol processing from the operating system configures that NIC to handle the TCP/IP flow indicated in the state handover message. Furthermore, the operating system configures the sockets library layer to direct traffic data from the application via a fast data path which avoids the kernel TCP/IP stack. Thus, the transfer of state to the NIC allows data transfers over the fast path to entirely bypass the operating system.

Over the fast data path, traffic data from an application is directed by the sockets layer to the Chimney switch (which is essentially a WSP embodying operating system functionality). The switch allows data to be sent directly to a TOE-enabled NIC via the TOE virtual hardware interface, bypassing the kernel TCP/IP stack.

For a TOE only chimney the kernel TCP/IP stack can be bypassed by the operating system and for an RDMA/TOE chimney, communication over the fast data path between the switch and NIC is achieved by means of the Sockets Direct Protocol (SDP). SDP is also a messaging protocol by which RDMA is achieved. The switch may be a base service provider (i.e. the lowest level WSP). Other similar alternatives are possible such as RDMA via a protocol called Winsock Direct Protocol (WSD) although it is currently unclear whether this protocol would be incorporated into a Chimney architecture.

Chimney preserves the sockets interface (Winsock) used by applications to request transmission of traffic data. When an application wishes to send data over the network to which a NIC is connected, the application sends a request to a user-mode library. Under the Microsoft Windows operating system this request is sent according to the Winsock API and applications are only therefore required to understand the Winsock API in order to transmit data. One or more Winsock Service Providers (WSPs) which interact with the Winsock via the Service Provider Interface (SPI) may be present in a system. A WSP may offer a transport library that handles, for example, TCP/IP traffic. Security layers, such as a virus checker, may also be provided as Winsock Service Providers. Typically, a transport library directs the data to be transmitted to a kernel mode protocol stack. The protocol stack performs the protocol processing and passes the data to a NIC for transmission over the appropriate network.

Under Microsoft Windows, the operating system maintains a catalogue of the service providers (WSPs) present in the data processing system and the order in which the service provider layers should be applied. Thus a virus checking WSP usually promotes itself as the primary WSP layer so that all data passing via the Winsock is scanned for viruses. When an application requests creation of a socket based on its address family, type and protocol identifier, the Winsock consults the parameters and order of registered WSPs and directs the data flow to the appropriate WSP or sequence of WSPs. A request by an application to transmit data via TCP/IP is therefore directed to a TCP/IP-capable WSP, possibly via WSP-layers offering other data processing or filtering functionality, such as a virus checking WSP. Under the layered WSP model, each WSP interacts with the next WSP in the chain according to the SPI.

Chimney also supports RDMA via the Sockets Direct Protocol (SDP) that enables direct communication between an application at the sockets layer and a TOE/RDMA network interface card. SDP operates between the Chimney switch and RDMA NIC and emulates sockets streaming semantics, so existing applications that rely on sockets can transparently and without modification take advantage of RDMA-optimized data transfers.

RDMA-enabled NICs are able to interpret RDMA-data plane protocols and deliver data directly into user-level buffers, in addition to running a TCP stack on a processor embedded on the NIC. Under the Chimney model, use of the RDMA protocol is negotiated once a TCP-plane connection has been established using the default kernel TCP/IP stack.

SUMMARY OF THE INVENTION

According to a first aspect of the present invention there is provided a software networking arrangement for operation in a first data processing system, the data processing system comprising: an operating system capable of processing a flow of traffic data received from an application supported by the first data processing system, the operating system being operable in: a first mode, in which the operating system performs protocol processing of a flow of traffic data and then passes the protocol processed data to a network interface device for transmission; and a second mode, in which the operating system does not perform protocol processing of a flow of traffic data, the operating system being arranged to, on entering the second mode, transmit a message to the network interface device indicating that the network interface device is to perform protocol processing of the flow of traffic data; the software networking arrangement comprising: a protocol processing entity; and a driver for a network interface device, the driver being configured to receive said message from the operating system and in response thereto, to configure the protocol processing entity to perform transport-level protocol processing of the flow of traffic data received from an application within the context of that application and then pass the protocol processed data to the network interface device.

Preferably the operating system is operable in the first mode for a first flow of traffic data and in the second mode for a second flow of traffic data, each flow of traffic data being associated with a particular application or socket of an application.

Preferably the driver is arranged to configure the protocol processing entity to perform transport-level protocol processing of the flow of traffic data received from the application by redirecting said message to the protocol processing entity.

Preferably, in response to the driver receiving said message, the software networking arrangement is arranged to create a new instance of the protocol processing entity to process the flow of traffic data received from the application. Alternatively, in response to the driver receiving said message, the software networking arrangement is arranged to create a new instance of the protocol processing entity to process the flow of traffic data received from a socket of the application.

Suitably the operating system is arranged to configure an interface between the application and the protocol processing entity to direct the flow of traffic data from the application to the network interface device.

Preferably, on entering the second mode, the operating system is arranged to cause an interface between the application and the protocol processing entity to direct the flow of traffic data from the application to the protocol processing entity if the protocol processing entity is associated with the driver of the network interface device.

On being configured to perform protocol processing of the flow of traffic data from the application, the protocol processing entity may be arranged to intercept that flow of traffic data from the application to the interface. Alternatively, on being configured to perform protocol processing of the flow of traffic data from the application, the protocol processing entity may be arranged to intercept a flow of data from the interface to the network interface device which corresponds to that flow of traffic data from the application.

Subsequent to being configured to perform protocol processing of the flow of traffic data from the application, the protocol processing entity may be arranged to intercept all flows of traffic data from that application to the interface.

Preferably the interface is a Chimney Switch.

Preferably the protocol processing entity is a user-level protocol processing entity.

Suitably the message is a state handover message. The state handover message may include an indication of the state of the flow of the traffic data.

The flow of traffic data may be associated with a socket of the application.

Preferably network-level protocol processing is performed at the network interface device. Suitably the network-level protocol processing includes calculating a checksum. Suitably the network-level protocol is Internet Protocol (IP). Suitably the IP-level protocol processing includes the DEMUX of packets based on protocol address bits. Preferably all higher-level protocol processing is performed at the protocol processing entity. Suitably the operating system is Microsoft Windows.

Preferably the protocol processing entity is a Winsock Service Provider. Alternatively the protocol processing entity is a System Area Network provider and the protocol processing entity is arranged to communicate with the interface by means of the Sockets Direct Protocol.

Preferably the operating system is arranged to enter the second mode when the flow of traffic data from the application through the operating system matches one or more predetermined conditions. One of the predetermined conditions may be an elapsed time for which the data flow has been active. One of the predetermined conditions may be an amount of data transferred over the data flow.

The flow of traffic data may be sent over an RDMA connection and the driver may be arranged to configure the protocol processing entity to perform RDMA protocol processing of the flow of traffic data. Preferably the network interface device is arranged to perform stateless RDMA protocol processing. Suitably the stateless RDMA protocol processing includes performing a cyclic redundancy check (CRC).

On being configured to perform RDMA protocol processing, the protocol processing entity may be arranged to signal a second data processing system which terminates the RDMA connection to indicate that the software networking arrangement is operating at the first data processing system. Preferably, if the second data processing system responds to the first data processing system with an indication that it is also operating the software networking arrangement, the protocol processing entities at the first and second data processing systems are arranged to take down the RDMA connection and to subsequently process the transport data in accordance with the underlying transport-layer protocol.

Suitably the transport layer protocol is the TCP protocol.

Suitably the driver is arranged to indicate to the operating system that it represents a network interface device supporting a TCP offload engine. Suitably the driver is arranged to indicate to the operating system that it represents a network interface device supporting an RDMA-TCP offload engine.

The software networking arrangement may be stored on a data carrier.

According to a second aspect of the present invention there is provided a software networking arrangement for operation in a first data processing system, the data processing system comprising: an operating system capable of processing a flow of data packets received at a network interface device for an application supported by the first data processing system, the operating system being operable in: a first mode, in which the operating system performs protocol processing of a flow of data packets and then passes the protocol processed data to the application; and a second mode, in which the operating system does not perform protocol processing of a flow of data packets, the operating system being arranged to, on entering the second mode, transmit a message to the network interface device indicating that the network interface device is to perform protocol processing of the flow of data packets; the software networking arrangement comprising: a protocol processing entity; and a driver for a network interface device, the driver being configured to receive said message from the operating system and, in response thereto, to configure the protocol processing entity to perform transport-level protocol processing of the flow of data packets received at the network interface device and then pass the protocol processed data to the application associated with the flow of data packets, the protocol processing being performed within the context of that application.

Preferably the operating system is arranged to operate in the first mode for a first flow of data packets and in the second mode for a second flow of data packets, each flow of data packets being associated with a particular application or socket of an application.

The software networking arrangement may be stored on a data carrier.

According to a third aspect of the present invention there is provided a method for processing data by means of a data processing system, the system supporting an operating system and at least one application, and having access to a network interface device; the method comprising the steps of: the operating system: receiving a flow of traffic data from an application; performing protocol processing of the flow of traffic data; passing the protocol processed data to the network interface device for transmission; determining that the network interface device is to perform protocol processing of the flow of traffic data received from the application; and transmitting to the network interface device a message indicating that the network interface device is to take over protocol processing of the flow of traffic data; the driver receiving said message from the operating system and in response thereto configuring a protocol processing entity to perform transport-level protocol processing of the flow of traffic data within the context of the application.

Preferably the operating system is arranged to determine that the network interface device is to perform protocol processing of the flow of traffic data when the flow of traffic data from the application through the operating system matches one or more predetermined conditions. One of the predetermined conditions may be an elapsed time for which the data flow has been active. One of the predetermined conditions may be an amount of data transferred over the data flow.

Preferably the driver is arranged to configure the protocol processing entity to perform transport-level protocol processing of the flow of traffic data received from the application by redirecting said message to the protocol processing entity.

Preferably, in response to the driver receiving said message, the software networking arrangement is arranged to create a new instance of the protocol processing entity to process the flow of traffic data received from the application.

Suitably, on entering the second mode, the operating system is arranged to configure an interface between the application and the protocol processing entity to direct the flow of traffic data from the application to the network interface device.

Preferably the operating system is arranged to cause an interface between the application and the protocol processing entity to direct the flow of traffic data from the application to the protocol processing entity if the protocol processing entity is associated with the driver of the network interface device.

According to a fourth aspect of the present invention there is provided a method for processing data by means of a data processing system, the system supporting an operating system and at least one application, and having access to a network interface device; the method comprising the steps of: the operating system: receiving a flow of data packets from the network interface device for an application; performing protocol processing of the flow of data packets; passing the protocol processed data to the application; determining that the network interface device is to perform protocol processing of the flow of data packets received at the network interface device for the application; and transmitting to the network interface device a message indicating that the network interface device is to take over protocol processing of the flow of data packets; the driver receiving said message from the operating system and in response thereto configuring a protocol processing entity to perform transport-level protocol processing of the flow of data packets within the context of the application.

According to a fifth aspect of the present invention there is provided a software networking arrangement for operation in a data processing system, the data processing system comprising: an operating system capable of processing a flow of traffic data received from an application supported by the data processing system, the operating system being operable in: a first mode, in which the operating system performs protocol processing of a flow of traffic data and then passes the protocol processed data to a network interface device for transmission; and a second mode, in which the operating system does not perform protocol processing of a flow of traffic data; wherein the operating system is arranged to, on entering the first mode, transmit a message to the network interface device indicating that the operating system is to perform protocol processing of the flow of traffic data; the software networking arrangement comprising: a protocol processing entity operable to perform transport-level protocol processing of a flow of traffic data received from an application within the context of that application and then pass the protocol processed data to a network interface device; and a driver for that network interface device, the driver being configured to receive said message from the operating system and, if the protocol processing entity is performing protocol processing of the flow of traffic data, to configure the protocol processing entity to cease performing protocol processing of that flow of traffic data.

Preferably the operating system is arranged to operate in the first mode for a first flow of traffic data and in the second mode for a second flow of traffic data, each flow of traffic data being associated with a particular application or socket of an application.

On entering the first mode, the operating system may be arranged to configure an interface between the application and the protocol processing entity to direct the flow of traffic data from the application to the operating system.

Preferably the interface is a Chimney Switch.

Suitably the message is a state reclaim message.

Preferably the driver is arranged to configure the protocol processing entity to cease performing protocol processing of the flow of traffic data by redirecting said message to the protocol processing entity.

The software networking arrangement may be stored on a data carrier.

According to a sixth aspect of the present invention there is provided a method for processing data by means of a data processing system, the system supporting an operating system, a protocol processing entity, at least one application, and having access to a network interface device; the method comprising the steps of: the protocol processing entity: receiving a flow of traffic data from an application; performing transport-level protocol processing of the flow of traffic data within the context of the application; passing the protocol processed data to the network interface device for transmission; determining by means of the operating system that the operating system is to perform protocol processing of the flow of traffic data received from the application; transmitting to the network interface device a message indicating that the operating system is to take over protocol processing of the flow of traffic data; and the driver receiving said message and in response thereto configuring the protocol processing entity to cease performing protocol processing of the flow of traffic data for the application.

According to a seventh aspect of the present invention there is provided a driver for a network interface device, the driver being supported by a data processing system having access to the network interface device, the data processing system further supporting an operating system, at least one application and a protocol processing entity capable of performing protocol processing of a traffic data flow within the context of an application with which the data flow is associated, the driver being operable to: intercept a state handover message sent from the operating system to the network interface device indicating that the network interface device is to take over protocol processing of a traffic data flow; and direct said message to the protocol processing entity so as to cause the protocol processing entity to take over protocol processing of the traffic data flow.

Suitably the driver is arranged to indicate to the operating system that it represents a network interface device supporting a TCP offload engine.

Suitably the driver is arranged to indicate to the operating system that it represents a network interface device supporting an RDMA-TCP offload engine.

The driver may be stored on a data carrier.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 4:
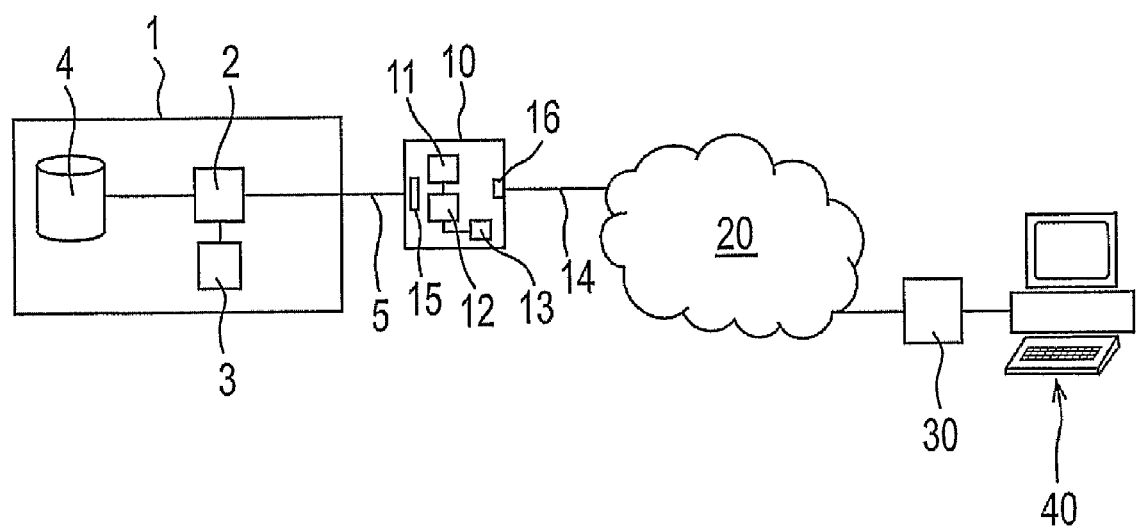
FIG. 4 is a schematic diagram of a network interface device in use.

FIG. 4 is a schematic diagram showing a network interface device such as a network interface card (NIC) and the general architecture of the system in which it may be used. The network interface device 10 is connected via a data link 5 to a processing device such as computer 1, and via a data link 14 to a data network 20. Further network interface devices such as processing device 30 are also connected to the network, providing interfaces between the network and further processing devices such as processing device 40.

The computer 1 may, for example, be a personal computer, a server or a dedicated processing device such as a data logger or controller. In this example it comprises a processor 2, a program store 4 and a memory 3. The program store stores instructions defining an operating system and applications that can run on that operating system. The operating system provides means such as drivers and interface libraries by means of which applications can access peripheral hardware devices connected to the computer. Drivers and libraries that are external to the operating system may also be provided.

A typical computer system 1 includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Figure 1:
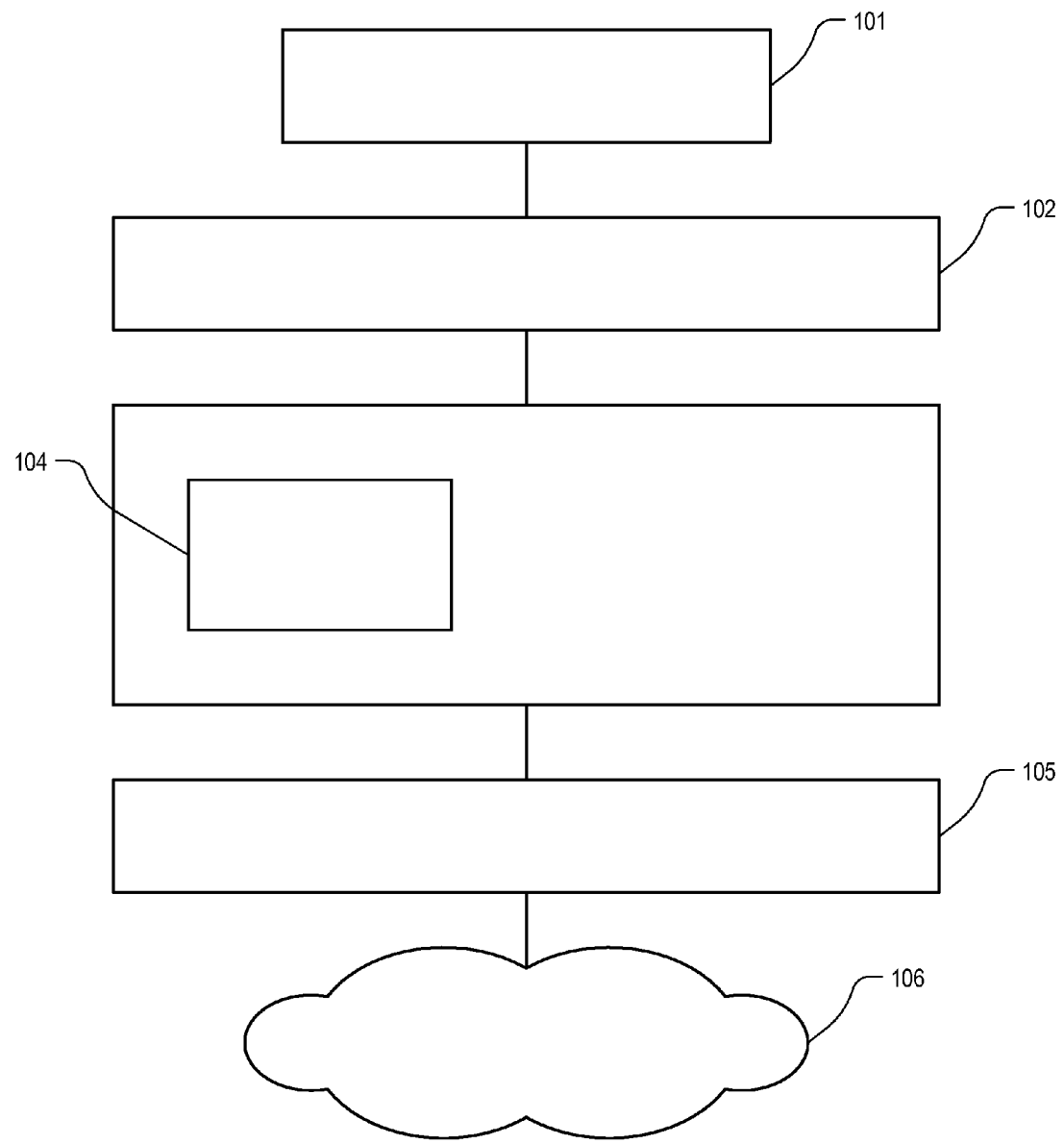
FIG. 1 shows a data processing system of the prior art.
Figure 2:
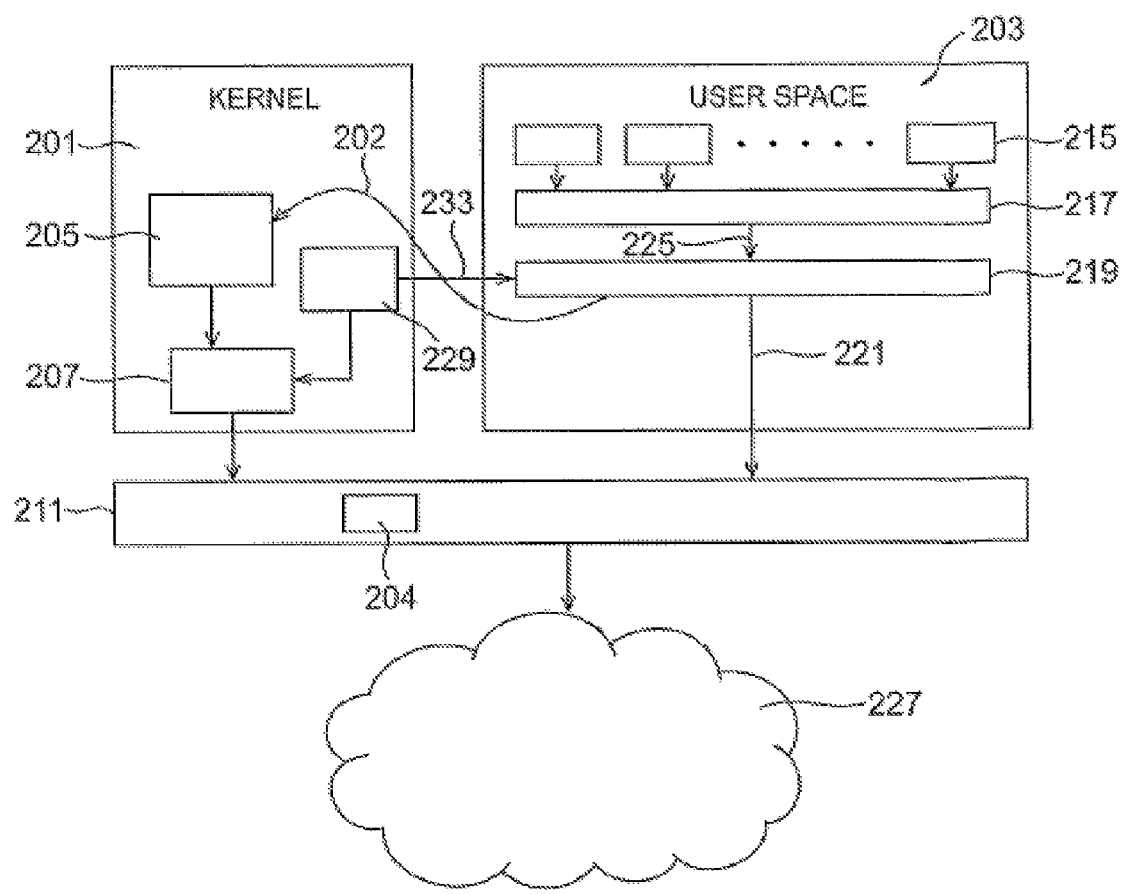
FIG. 2 shows a data processing system in accordance with the Chimney network architecture.

FIG. 2 shows a data processing system in accordance with the Chimney network architecture. It includes a computer system which may be in accordance to the system 1 of FIG. 4. In such a system kernel 201 and software running in user space 203 are implemented using software instructions which direct the operation of a processor such as 2 (FIG. 4). NIC 211 is one of the peripheral devices described above with respect to FIG. 4.

Referring to FIG. 2, Winsock 217 receives a request from an application 215 that wishes to send data over network 227. Application 215 communicates with the winsock via the Winsock API. Socket calls received by the winsock are passed onto switch 219, which is a Winsock Service Provider (WSP). Communication between the winsock and switch is over SPI interface 225. The switch may receive data via intermediate WSPs embodying, for example, security layers such as virus checkers.

The switch distributes the data flows in accordance with a directory maintained by the switch that indicates the transport libraries responsible for managing each data flow (i.e. which transport libraries are to perform the protocol processing). The switch updates the directory in response to messages received from the operating system that identify which transport libraries are to manage which data flows.

When a new socket is set up for a TCP/IP connection, the default kernel stack manages the TCP/IP data flow. Thus switch 219 directs the flow of data from the application socket to the kernel TCP/IP stack 205. This is indicated by data flow arrow 202.

In order to relieve the burden of protocol processing from the operating system (and hence the system CPU), the operating system can pass management of a given data flow to TCP/IP Offload Engine (TOE) 204 provided by network interface device 211. To effect the handover, state control entity 229 transmits a state handover message 233 to TOE NIC driver 207. This message forms part of the NDIS messaging functionality. TOE NIC 211 subsequently handles the data flow indicated in the state handover message. In order to provide the TOE NIC with the traffic data for protocol processing and transmission, the state control entity 229 also messages switch 219 to indicate to the switch that subsequent traffic data for the data flow being handed over is to be sent via the fast path 221. The fast path is provided by the SDP architecture, which defines a direct data path between the switch and TOE NIC.

Figure 3:
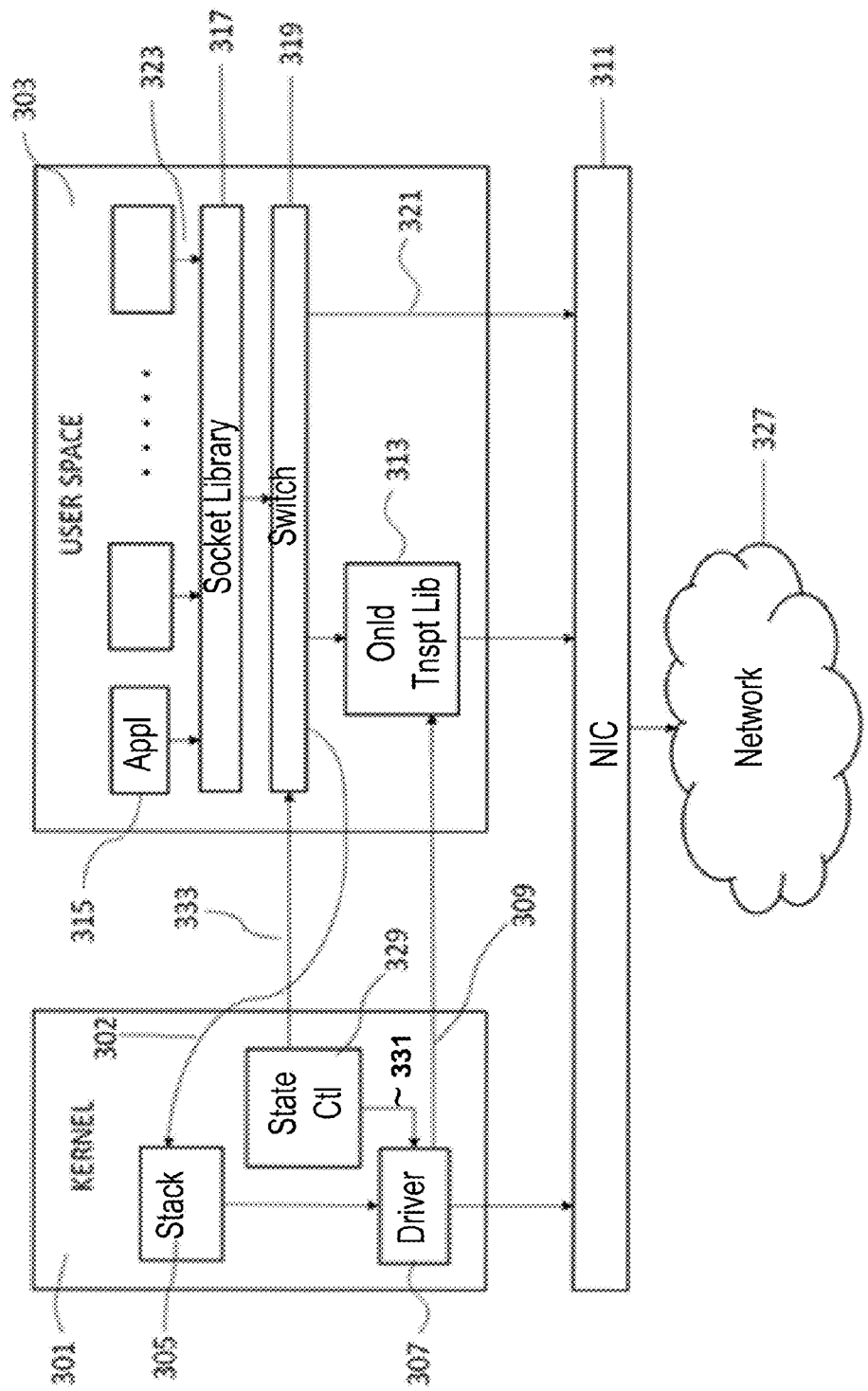
FIG. 3 shows a data processing system in accordance with the present invention.

FIG. 3 shows a data processing system in accordance with the present invention. It includes a computer system which may be in accordance to the system 1 of FIG. 4. In such a system kernel 301 and software running in user space 303 are implemented using software instructions which direct the operation of a processor such as 2 (FIG. 4). NIC 311 is one of the peripheral devices described above with respect to FIG. 4.

Referring to FIG. 3, Socket library 317 receives a request from an application 315 that wishes to send data over network 327. Socket library 317 is typically provided by the operating system: in Microsoft Windows, the Windows Socket library (Winsock) is provided. Application 315 communicates with the socket library via interface 323, which in Windows is typically the Winsock API. Socket calls received by the socket library are passed onto switch 319, which in Windows would be a Winsock Service Provider (WSP).

The switch acts to distribute each data flow to the appropriate transport library. When a new socket is requested by an application, the default kernel stack manages the data flow. Thus switch 319 directs the flow of data from the application socket to the kernel stack 305. This is indicated by flow arrow 302.

The operating system is operable to hand over the state of a data flow to a network interface device having protocol-processing capabilities. Typically, the operating system may determine whether or not a given NIC is capable of performing protocol processing by querying the driver of that NIC, or by consulting a system file or registry information.

The present invention allows the operating system to hand over protocol processing to a software-implemented stack by means of the mechanism provided by the operating system to allow the handover of protocol processing to a hardware stack implemented at a protocol-processing NIC. However, a data processing system in accordance with the present invention need not comprise network hardware capable of performing protocol processing.

The operating system may initiate state handover when a data flow matches one or more predetermined scenarios or conditions. These conditions may be: elapsed time since creation of a connection, amount of data transferred over a connection, or any other predetermined condition. A connection may be defined in terms of the socket at which the corresponding data flow terminates, the application at which the corresponding data flow terminates, or by any other identifier of a particular data flow.

A transport architecture in accordance with the present invention includes an onload transport library. An onload transport library is a transport library which is dedicated to an application. An onload transport library performs processing of data for transmission and data received at a network interface device within the context of the application to which it is bound. The processing of data by an onload transport library is temporally close to the application processing the data.

Onload transport library 517 is typically a non-operating-system functionality providing a network protocol stack. An instance of the transport library is preferably created for each application having data to send, or for each socket by which data may be sent. The data flows to and from each application may therefore be independently managed by the respective instances of the transport library.

Transport library 517 includes a TCP/IP stack, with TCP/IP protocol processing being performed in the transport library. This allows the good price:performance ratio of system CPU(s) (as compared to dedicated network card processors) to be fully utilised. Furthermore, in operating the transport library in user mode, no context switching is required in order for an application to transmit data across the network, no interrupts are required for an application to receive data and the processing of data by the application is closely coupled with the execution of the transport library.

Driver 307 is configured to appear to the operating system as a driver for a NIC that is capable of performing protocol processing. Driver 307 may achieve this by supporting those commands which usually allow handover of a connection from the operating system to a protocol-processing NIC. Alternatively or additionally, driver 307 may inform the operating system (by means of a flag, register entry etc.) that NIC 311 is a NIC capable of performing protocol processing.

By passing itself off as a driver for a protocol processing NIC, driver 307 may receive state handover messages from the operating system. When driver 307 receives a state handover message 331 indicating that NIC 311 is to take over management of a particular data flow, the driver redirects the state handover message to an instance of the onload transport library 313 running on the host CPU. Onload transport library 313 is configured to take over management of that particular data flow. A new instance of onload transport library 313 may be created to handle the data flow. Under Windows, onload transport library 313 is preferably a Winsock Service Provider (WSP).

Since driver 307 presents itself to the operating system as a driver for a protocol-processing NIC and since the handover is carried out by means of the usual state handover mechanism, the operating system is typically unaware that the protocol processing is being performed at an onload stack, rather than at a stack supported by a NIC. The present invention therefore allows applications to utilise an onload TCP stack by means of the standard socket interface provided to the applications by the operating system.

The state handover message may be modified by the driver before it is passed onto the onload stack. Instead of the state handover message itself being sent to the onload stack, a message indicating that the driver has received a state handover message may be sent to the onload stack.

Preferably, protocol processing takes place both on the NIC and in the onload transport library. However, transport layer processing is not done on the NIC. In embodiments of the present invention, protocol processing is split such that network-level processing is done on the NIC and all higher level processing is done on the host CPU. The network-level protocol may be Internet Protocol (IP) and the IP-level protocol processing preferably includes the DEMUX of packets based on protocol address bits.

Typically, the state control entity forms part of the operating system. The protocol may be any network protocol. The protocol may be TCP.

In accordance with an embodiment of the present invention, the driver 307 is configured to appear to the operating system that it is a driver for a protocol-processing enabled NIC, and therefore one capable of protocol processing. In fact, the NIC does not need to be capable of protocol processing. Driver 307 appears to the operating system that it is a driver for a TOE-enabled NIC because driver 307 implements the TOE Chimney API—i.e. the instruction set by which the operating system can hand over a connection state. The TOE Chimney API is defined in the latest versions of the Microsoft Scalable Networking Packs.

Preferably onload transport library 313 is registered with an instance of driver 307. Preferably the operating system provides a mechanism for registering a transport library with a driver instance. Upon state handover, the state control entity 329 messages switch 319 to indicate to the switch that subsequent traffic data for the data flow being handed over is to be sent to NIC 311. Since the transport library is registered or in some way associated with driver 307, transport data destined for NIC 311 may be sent via transport library 313 (which in Windows would be a WSP layer). Preferably the operating system provides a mechanism by which a transport library may be associated or registered with a network interface driver. The transport library may therefore perform the protocol processing and pass the at least partially formed data packets to the NIC.

Once the protocol processing has been performed in the transport library the data is passed to the NIC for transmission across the network by writing the data to a transmit buffer. Buffers are allocated in memory on the data processor for use in cooperation with the NIC for the transmission and/or reception of data over the network. In the case of a transmit buffer, which is for use in transmitting data, the NIC is configured for reading data from that buffer and transmitting it over the network. The NIC may automatically read that data and transmit it, or it may be triggered to read the data by the transport library or the operating system running on the data processor. The trigger can conveniently be a doorbell write to a location decoded by the NIC which identifies the data structure requiring transmission. In the case of a receive buffer, which is for use in receiving data, the NIC is configured for writing to that buffer data received over the network. The data in the receive buffer may then be read by the transport library and further processed by it.

In the case of transmission of data, the application will be expected to write data to a buffer for transmission and then trigger the NIC to read from the buffer to transmit that data. In some situations this alone may be sufficient to allow the data to be transmitted successfully over the network. However, the NIC does not perform transport-level protocol processing of transmitted or received data. Instead this is performed by the transport library.

In the case of reception of data, the NIC parses each packet and determines to which transport library (i.e. which receive interface) the packet data should be sent. The NIC will then write the data to the determined receive buffer.

In the case of received data the processing by either the transport library or the operating system will typically involve protocol processing: e.g. checking of packet sequence numbers, executing congestion control and avoidance algorithms and removal of data from the buffer for use by the application. When the transport library handles the protocol processing, the processing preferably occurs in the context of the application.

Whilst the buffers are preferably allocated by the operating system, it is convenient for that to be done in response to a request from the transport library on behalf of an application (typically at start of day). Thus, if the received data might overflow the available receive buffers for an application, the transport library can request allocation of further buffers by the operating system.

It should be noted that the transmit and receive buffers defined above are internal to the data processing system, i.e. the buffers are not addressable by entities on the network external to the data processing system. The above system achieves user-level networking or more generally network onloading, without requiring the transfer of information regarding those buffers over the network. Preferably the buffers are addressable only by the NIC and the transport library.

In one embodiment in which there is no mechanism to register transport library with an instance of the NIC driver, the transport library is configured to catch calls to the switch and determine whether or not they correspond to connections that are managed by the transport library. Those calls which correspond to connections that are managed by the transport library are intercepted and the data flow handled by the transport library (i.e. the traffic data is processed in accordance with the network protocol to be applied and the processed data passed to the NIC for transmission). Under Windows, the transport library may be embodied as a WSP layer which promotes itself so that all calls received at the Winsock pass through the transport layer WSP.

Alternatively, the transport library may be configured to receive data from the switch via the usual fast data path (discussed above in relation to FIG. 2). In other words, the transport library may present an interface to the switch that is compatible with the messaging interface via which data transfer from the switch to a NIC is normally mediated. In Windows the transport library could be embodied as a System Area Network (SAN) Provider and the interface would typically be an SDP interface.

The transport library may be generally operable to intercept calls to the switch and take over management of the corresponding data flows. In this case, the transport library determines which data flows it is to handle and which the operating system is to handle. This may be in addition to any determination performed by the operating system as to whether or not a given data flow is to be off-loaded to a hardware stack.

The transport library may be configured to intercept and handle those data flows for which the data is to be sent in accordance with a particular protocol. Alternatively, the transport library may intercept those data flows relating to a particular application/socket or set of applications/sockets. Alternatively, the transport library may intercept those data flows having any other predetermined characteristics.

In embodiments of the present invention, the operating system may not be a Microsoft Windows operating system. It is not important which messaging API or command interfaces are used, but only that driver 307 is configured to appear to the operating system as a driver for a TOE-enabled NIC that is capable of taking over the management of a data flow.

The term TOE is used throughout this application to refer to a NIC capable of performing protocol processing and managing the state of a connection. However, the protocol according to which data is processed and the connection managed may be any network protocol and is not restricted to being TCP/IP.

The operating system may attempt to reclaim the state of a particular data flow by sending a state reclaim message to driver 307. When operating in accordance with the Chimney architecture, the driver signals to the onload transport library to cease protocol processing and hand over the state of the data flow back to the operating system. The driver may signal the onload transport library by forwarding the (possibly modified) state reclaim message to the transport library. The operating system also configures the Chimney switch to direct further application transport data to the operating system rather than the onload transport library.

In cases in which the onload transport library is configured to intercept calls to the switch, onload transport library may be configured to cease intercepting those calls corresponding to the data flow which the operating system wishes to reclaim. Alternatively, the onload transport library may itself determine whether or not to hand back the state of a data flow to the operating system. The onload transport library would therefore ignore any state reclaim messages from the operating system and continue to intercept those switch calls which it has itself determined to handle.

A feature of the present invention is that the transport library is provided in an onload configuration. In other words, the protocol processing performed by the transport library is loaded onto the CPU and not off-loaded to a processor on a NIC. The transport library performs transport-level protocol processing. Network-level (such as IP) protocol processing may be performed at the NIC and all higher-level protocol processing would be performed at the transport library. This may include TCP and possibly RDMA protocol processing, as required. The protocol processing performed at the NIC may include or be limited to the DEMUX of packets based on protocol address bits and/or the calculation of a checksum.

In embodiments of the present invention, a new instance of the transport library is created for each application that requests a connection. Network protocol stacks are therefore defined on a per-application basis. In the most closely coupled onload arrangement, the transport library is a user-mode object and each instance of the transport library is directly associated with a particular application. The application and transport library may be separated by a dynamic link resolved function call. This allows the transport library to carry out protocol processing within the context of the application to which it is bound. However other embodiments of an onloaded configuration are possible. For example, each instance of the transport library may be associated with a particular application, but separated by a system call interface.

In the case that the transport library is separated from the application by a system call interface, many of the benefits of a full user level transport library are provided, with the exception that there is some context switch overhead. This architecture would be useful where the security policies of the system would not allow a user-level implementation of the transport library.

Under Microsoft Windows, the non-operating-system functionality (the transport library) is preferably implemented as a WSP. The WSP can be thought of as a per-application transport stack. Data is therefore received directly to a subcomponent of an existing operating system socket library. A user-level transport library would therefore receive data from an operating system API.

There are a number of protocols, such as RDMA and iSCSI, which are designed to run in an environment where the TCP and other protocol code executes on the network interface device. As described above, the Chimney architecture supports off-loaded protocol processing engines by providing a direct data path between the switch and a suitable virtual hardware interface (usually provided by the hardware vendor). Facilities will now be described whereby such protocols can execute on the host CPU (i.e. using the processing means of the computer to which a network interface card is connected). Such an implementation is advantageous because it allows a user to take advantage of the price/performance lead of main CPU technology as against co-processors.

Protocols such as RDMA involve the embedding of framing information and cyclic redundancy check (CRC) data within the TCP stream. While framing information is trivial to calculate within protocol libraries, CRC's (in contrast to checksums) are computationally intensive and best done by hardware. To accommodate this, when a TCP stream is carrying an RDMA or similar encapsulation an option in the virtual interface can be is enabled, for example by means of a flag. On detecting this option, the NIC will parse each packet on transmission, recover the RDMA frame, apply the RDMA CRC algorithm and insert the CRC on the fly during transmission. Analogous procedures can beneficially be used in relation to other protocols, such as iSCSI, that require computationally relatively intensive calculation of error check data.

In line with this system the network interface device can also verify CRCs on received packets using similar logic. This may, for example, be performed in a manner akin to the standard TCP checksum off-load technique.

Protocols such as RDMA also mandate additional operations such as RDMA READ which in conventional implementations require additional intelligence on the network interface device. This type of implementation has led to the general belief that RDMA/TCP should best be implemented by means of a co-processor network interface device. In an architecture of the type described herein, specific hardware filters can be encoded to trap such upper level protocol requests for a particular network connection. In such a circumstance, the NIC can generate an event akin to the timer event in order to request action by software running on the attached computer, as well a delivery data message. By triggering an event in such a way the NIC can achieve the result that either the transport library, or the kernel helper will act on the request immediately. This can avoid the potential problem of kernel extensions not executing until the transport library is scheduled and can be applied to other upper protocols if required.

An RDMA-enabled NIC performs all statefull protocol processing, typically on a processor on the NIC. This is to be contrasted with the methods in accordance with the present invention, in which statefull protocol processing is performed at the host CPU and preferably in the context of the application to which data is being sent or transmitted from. As described, stateless protocol processing (such as checksum calculations) may be performed on the NIC. Thus, in the preferred embodiments, the onload transport library handles all protocol processing above the network-level (e.g. IP-level). This would include TCP and possibly RDMA processing.

For the operating system to hand over an RDMA connection state to NIC 311, driver 307 is configured to appear to the operating system as a driver for a NIC that is capable of the RDMA performing protocol processing (i.e. an RDMA-TOE NIC). Driver 307 may achieve this by supporting those commands which usually allow handover of a connection from the operating system to an RDMA-TOE NIC. Alternatively or additionally, driver 307 may inform the operating system (by means of a flag, register entry etc.) that NIC 311 is capable of performing the RDMA-level protocol processing. However, in accordance with the principles of the present invention, NIC 311 need not be capable of RDMA processing since the connection state is actually handed over to transport library 307.

Typically RDMA SANs are connection oriented and require signalling through a non-IP control plane. These operations are implemented within the kernel and a data transfer operation therefore requires the use of kernel system calls. Furthermore, the RDMA model allows a remote application to be given read or write access to a region of memory in an application's address space. Buffers allocated for remote direct memory access must be uniquely named so that they can be referred to over the network. Since buffer resources are finite within a system and since the number of resources required in this model grows as the number of communicating hosts in a cluster grows, the algorithms for efficiently managing this are complex and result in more signalling messages being sent around the network.

The present invention allows the direct transfer of data over a low latency fast path between applications that are remote to one another but without supporting the RDMA model as such. The complexity of an RDMA SAN Provider running under the Chimney architecture is not required. For example, no signalling messages to grant or revoke read or write rights to buffers are required. Buffers are allocated by the operating system to a transport library and NIC/driver operating according to the principles of the present invention. Preferably buffers are allocated in response to requests made by the transport library or driver. These requests may be made in response to the creation of new sockets or data flows. Buffers are not therefore allocated to (or addressable by) remote applications or allocated on a connection-oriented basis.

The present invention provides a low-latency data path over which traffic data may be transferred directly into and out of a memory area that is accessible to an application. In comparison, the RDMA architecture introduces significant processing overheads and a complicated buffer structure to achieve memory-to-memory network transfers. It is therefore advantageous in many situations to use the data transfer mechanisms taught herein in favour of conventional RDMA data transfer mechanisms.

In embodiments of the present invention, the transport library determines whether or not an RDMA connection it is supporting is to another data processing system operable in accordance with the present invention (i.e. the connection is supported at each endpoint by a transport library operating in accordance with the present invention). The transport library may perform this determination for an RDMA connection when it is handed that connection by the operating system (e.g. when driver 307 receives an RDMA handover message form the operating system). The operating system typically negotiates an RDMA connection once a data flow is established by means of a lower level protocol (such as TCP/IP). In the case in which the transport library is configured to intercept calls to the switch, the transport library may perform the determination for calls relating to RDMA connections.

The transport library may determine whether or not a particular RDMA connection, or request for an RDMA connection, is between two data processing systems operable in accordance with the present invention by performing additional signalling. The transport library may signal the other endpoint of an RDMA connection in order to determine whether or not it supports a transport library operating in accordance with the present invention. If the other endpoint is also a transport library operating in accordance with the present invention it may signal back to the first transport library a message to that effect. Further signalling may take place between the transport library endpoints in order to establish, for example, which protocol is to be used when the RDMA connection is taken down. The other endpoint may signal that the RDMA connection is to be maintained: if this occurs, it may signal at some later point that it is ready to take down the RDMA connection. Either transport library may periodically signal the other to determine whether or not the other is ready to take down the RDMA connection. Preferably the protocol is TCP/IP. The transport libraries at each end of the connection may use the default mechanisms provided by the operating system to take down the RDMA connection.

Note that driver 307, instead of or in combination with the transport library, may determine whether or not the data processing system it is communicating with across the network by means of RDMA is also operating in accordance with the present invention.

These embodiments allow the net amount of cross network communication to be reduced while retaining the advantages of a low latency data path between memory areas accessible to applications at both ends of a connection.

While the present invention has been described in the context of fully functioning data processing systems, those of ordinary skill in the art will appreciate that the processes described herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A system comprising a first data processing system, the first data processing system having access to a network interface device and comprising:
   a memory;
   a processor subsystem coupled to the memory, the processor subsystem configured to run a kernel and a software networking arrangement,
   wherein the kernel is capable of processing a flow of traffic data received from an application supported by the first data processing system, the kernel being operable to:
   transmit a message which causes a protocol processing entity in user space to perform protocol processing of the flow of traffic data,
   and wherein the software networking arrangement comprises:
   said protocol processing entity in user space; and
   a driver configured to receive said message from the kernel and in response thereto, to send a message to user space to configure the protocol processing entity to perform, in user space within the context of the application, transport-level protocol processing of the flow of traffic data received from the application supported by the first data processing system and then pass the protocol processed data to the network interface device for transmission.

2. A system as claimed in claim 1, wherein the driver is arranged to configure the protocol processing entity to perform transport-level protocol processing of the flow of traffic data received from the application by redirecting said message to the protocol processing entity.

3. A system as claimed in claim 1, wherein, in response to the driver receiving said message, the software networking arrangement is arranged to create a new instance of the protocol processing entity to process the flow of traffic data received from the application or a socket of the application.

4. A system as claimed in claim 1, wherein the message is a state handover message including an indication of the state of the flow of the traffic data.

5. A system as claimed in claim 1, wherein the flow of traffic data is to be sent over an RDMA connection and the driver is arranged to configure the protocol processing entity to perform RDMA protocol processing of the flow of traffic data; and
   on being configured to perform RDMA protocol processing, the protocol processing entity is arranged to signal a second data processing system which terminates the RDMA connection to indicate that the software networking arrangement is operating at the first data processing system.

6. A system as claimed in claim 5, wherein, if the second data processing system responds to the first data processing system with an indication that it is also operating the software networking arrangement, the protocol processing entities at the first and second data processing systems are arranged to take down the RDMA connection and to subsequently process the transport data in accordance with the underlying transport-layer protocol.

7. A system as claimed in claim 1, wherein the kernel is operable in:

a first mode, in which the kernel performs protocol processing of a flow of traffic data and then passes the protocol processed data to a network interface device for transmission; and a second mode, in which the kernel does not perform protocol processing of a flow of traffic data, the kernel being arranged to, on entering the second mode, transmit the message which causes said protocol processing entity in user space to perform protocol processing of the flow of traffic data.

8. A system as claimed in claim 7, wherein the kernel is operable in the first mode for a first flow of traffic data and in the second mode for a second flow of traffic data, each flow of traffic data being associated with a particular application or socket of an application.

9. A system as claimed in claim 7, wherein on entering the second mode, the kernel is arranged to:

configure an interface between the application and the protocol processing entity to direct the flow of traffic data from the application to the network interface device; or cause an interface between the application and the protocol processing entity to direct the flow of traffic data from the application to the protocol processing entity if the protocol processing entity is associated with the driver of the network interface device.

10. A system as claimed in claim 9, wherein, on being configured to perform protocol processing of the flow of traffic data from the application, the protocol processing entity is arranged to:

intercept that flow of traffic data from the application to the interface; or intercept a flow of data from the interface to the network interface device which corresponds to that flow of traffic data from the application; or subsequent to being configured to perform protocol processing of the flow of traffic data from the application, the protocol processing entity is arranged to intercept all flows of traffic data from that application to the interface.

11. A system as claimed in claim 7, wherein the kernel is arranged to enter the second mode when the flow of traffic data from the application through the kernel matches one or more predetermined conditions.

12. A system as claimed in claim 11, wherein one of the predetermined conditions is a member of the group consisting of:

an elapsed time for which the data flow has been active; and an amount of data transferred over the data flow.

13. A system as claimed in claim 7, wherein the kernel is arranged to operate in the first mode for a first flow of traffic data and in the second mode for a second flow of traffic data, each flow of traffic data being associated with a particular application or socket of an application.

14. A system as claimed in claim 7, wherein, on entering the first mode, the kernel is arranged to configure an interface between the application and the protocol processing entity to direct the flow of traffic data from the application to the kernel.

15. A system as claimed in claim 1, wherein the operating system is arranged to direct the message which causes said protocol processing entity in user space to perform protocol processing of the flow of traffic data to the network interface device, wherein the driver is configured to intercept said message.

16. A computer readable storage medium having stored thereon a plurality of software code portions which when executed by a first data processing system run a kernel and a software networking arrangement, wherein the first data processing system has access to a network interface device, wherein the kernel is capable of processing a flow of traffic data received from an application supported by the first data processing system, the kernel being operable to:

transmit a message which causes a protocol processing entity in user space to perform protocol processing of the flow of traffic data, and wherein the software networking arrangement comprises:

said protocol processing entity in user space; and a driver configured to receive said message from the kernel and in response thereto, to send a message to user space to configure the protocol processing entity to perform, in user space within the context of the application, transport-level protocol processing of the flow of traffic data received from an application supported by the first data processing system and then pass the protocol processed data to the network interface device for transmission.

17. A system comprising a first data processing system, the first data processing system having access to a network interface device and comprising:

a memory;

a processor subsystem coupled to the memory, the processor subsystem configured to run a kernel and a software networking arrangement, wherein the kernel is capable of processing a flow of data packets received at the network interface device for an application supported by the first data processing system, the kernel being operable to:

transmit a message which causes a protocol processing entity in user space to perform protocol processing of the flow of data packets, and wherein the software networking arrangement comprises:

said protocol processing entity in user space; and a driver configured to receive said message from the kernel and, in response thereto, to send a message to user space to configure the protocol processing entity to perform, in user space within the context of the application, transport-level protocol processing of the flow of data packets received at the network interface device and then pass the protocol processed data to the application associated with the flow of data packets.

18. A system as claimed in claim 17, wherein the kernel is arranged to be operable in:

a first mode, in which the kernel performs protocol processing of a flow of data packets and then passes the protocol processed data to the application; and a second mode, in which the kernel does not perform protocol processing of a flow of data packets, the operating system being arranged to, on entering the second mode, transmit the message which causes said protocol processing entity in user space to perform protocol processing of the flow of data packets.

19. A system as claimed in claim 18, wherein the kernel is arranged to operate in the first mode for a first flow of data packets and in the second mode for a second flow of data packets, each flow of data packets being associated with a particular application or socket of an application.

20. A computer readable storage medium having stored thereon in a non-transitory manner a plurality of software code portions which when executed by a first data processing system run a kernel and a software networking arrangement,
wherein the first data processing system has access to a network interface device,
wherein the kernel is capable of processing a flow of data packets received at the network interface device for an application supported by the first data processing system, the kernel being operable to:
transmit a message which causes a protocol processing entity in user space to perform protocol processing of the flow of data packets, and wherein the software networking arrangement comprises:
said protocol processing entity in user space; and
a driver configured to receive said message from the kernel and, in response thereto, to send a message to user space to configure the protocol processing entity to perform, in user space within the context of the application, transport-level protocol processing of the flow of data packets received at the network interface device and then pass the protocol processed data to the application associated with the flow of data packets.

21. A method for processing data by means of a data processing system, the system supporting a kernel, a driver, and at least one application, and having access to a network interface device; the method comprising the steps of:
the kernel:
receiving a flow of traffic data from an application supported by the data processing system;
performing protocol processing of the flow of traffic data;
passing the protocol processed data to the network interface device for transmission; and
transmitting a message which causes a protocol processing entity in user space to perform protocol processing of subsequent traffic data in the flow of traffic data,
the driver receiving said message from the kernel and in response thereto sending a message to user space to configure the protocol processing entity to perform, in user space within the context of the application, transport-level protocol processing of the subsequent traffic data in the flow of traffic data.

22. A method as claimed in claim 21, wherein the kernel is arranged to determine that the network interface device is to perform protocol processing of the flow of traffic data when the flow of traffic data from the application through the kernel matches one or more predetermined conditions.

23. A method as claimed in claim 22, wherein one of the predetermined conditions is:
an elapsed time for which the data flow has been active; or
an amount of data transferred over the data flow.

24. A method as claimed in claim 21, wherein the driver is arranged to configure the protocol processing entity to perform transport-level protocol processing of the flow of traffic data received from the application by redirecting said message to the protocol processing entity.

25. A method as claimed in claim 21, wherein, in response to the driver receiving said message, the software networking arrangement is arranged to create a new instance of the protocol processing entity to process the flow of traffic data received from the application.

26. A method as claimed in claim 21, wherein the kernel is arranged to configure an interface between the application and the protocol processing entity to direct the flow of traffic data from the application to the network interface device.

27. A method as claimed in claim 21, wherein the kernel is arranged to cause an interface between the application and the protocol processing entity to direct the flow of traffic data from the application to the protocol processing entity if the protocol processing entity is associated with the driver of the network interface device.

28. A method for processing data by means of a data processing system, the system supporting a kernel, a driver, and at least one application, and having access to a network interface device; the method comprising the steps of:
the kernel:
receiving a flow of data packets from the network interface device for an application supported by the data processing system;
performing protocol processing of the flow of data packets;
passing the protocol processed data to the application; and
transmitting a message which causes a protocol processing entity in user space to perform protocol processing of subsequent traffic data in the flow of data packets,
the driver receiving said message from the kernel and in response thereto sending a message to user space to configure the protocol processing entity to perform, in user space within the context of the application, transport-level protocol processing of the subsequent traffic data of the flow of data packets.

29. A system comprising a data processing system, the data processing system having access to a network interface device and comprising:
a memory;
a processor subsystem coupled to the memory, the processor subsystem configured to run a kernel and a software networking arrangement,
wherein the kernel is capable of processing a flow of traffic data received from an application supported by the data processing system, the kernel being operable to:
transmit a message indicating that the kernel is to perform protocol processing of the flow of traffic data, and wherein the software networking arrangement comprises:
a protocol processing entity operable to perform, in user space within the context of the application, transport-level protocol processing of a flow of traffic data received from an application and then pass the protocol processed data to the network interface device for transmission; and
a driver configured to receive said message from the kernel and, if the protocol processing entity is performing protocol processing of the flow of traffic data, to configure the protocol processing entity to cease performing protocol processing of that flow of traffic data.

30. A system as claimed in claim 29, wherein the driver is arranged to configure the protocol processing entity to cease performing protocol processing of the flow of traffic data by redirecting said message to the protocol processing entity.

31. A system as claimed in claim 29, wherein the kernel is arranged to be operable in:

a first mode, in which the kernel performs protocol processing of a flow of traffic data and then passes the protocol processed data to a network interface device for transmission; and a second mode, in which the kernel does not perform protocol processing of a flow of traffic data, wherein the operating system is arranged to, on entering the first mode, transmit the message indicating that the kernel is to perform protocol processing of the flow of traffic data.

32. A system as claimed in claim 29, wherein the kernel is arranged to direct the message indicating that the kernel is to perform protocol processing of the flow of traffic data to the network interface device, wherein the driver is configured to intercept said message.

33. A computer readable storage medium having stored thereon in a non-transitory manner a plurality of software code portions which when executed by a data processing system run a kernel and a software networking arrangement, wherein the data processing system has access to a network interface device, wherein the kernel is capable of processing a flow of traffic data received from an application supported by the data processing system, the kernel being operable to:

transmit a message indicating that the kernel is to perform protocol processing of the flow of traffic data, and wherein the software networking arrangement comprises:

a protocol processing entity operable to perform, in user space within the context of the application, transport-level protocol processing of a flow of traffic data received from an application and then pass the protocol processed data to the network interface device for transmission; and a driver configured to receive said message from the kernel and, if the protocol processing entity is performing protocol processing of the flow of traffic data, to configure the protocol processing entity to cease performing protocol processing of that flow of traffic data.

34. A method for processing data by means of a data processing system, the system supporting a kernel, a driver, a protocol processing entity, at least one application, and having access to a network interface device; the method comprising the steps of:

the protocol processing entity:

receiving a flow of traffic data from an application supported by the data processing system;

performing, in user space within the context of the application, transport-level protocol processing of the flow of traffic data;

passing the protocol processed data to the network interface device for transmission;

determining by means of the operating system that the kernel is to perform protocol processing of the flow of traffic data received from the application;

transmitting a message indicating that the kernel is to perform protocol processing of the flow of traffic data; and the driver receiving said message and in response thereto configuring the protocol processing entity to cease performing protocol processing of the flow of traffic data for the application.

* * * * *